US 6,661,653 B1

(12) United States Patent
Holmen et al.

(10) Patent No.: US 6,661,653 B1
(45) Date of Patent: Dec. 9, 2003

(54) APPARATUS FOR DATA ENTRY

(76) Inventors: Paul M. Holmen, 7260 Chetwood Dr., Tujunga, CA (US) 91042; Gabriel M. Badea, 7270 Chetwood Dr., Tujunga, CA (US) 91042

(*) Notice: Subject to any disclaimer, the term of this patent is extended or adjusted under 35 U.S.C. 154(b) by 99 days.

(21) Appl. No.: 09/621,369

(22) Filed: Jul. 21, 2000

Related U.S. Application Data (60) Provisional application No. 60/145,078, filed on Jul. 21, 1999.

(51) Int. Cl.$^7$ .................................................. G06F 1/16
(52) U.S. Cl. ........................ 361/686; 361/673; 361/680; 361/681; 345/169; 400/475; 248/205.2
(58) Field of Search ................................ 345/156, 168, 345/169, 170, 1.3; 200/5 A; 341/22; 235/462.43, 462.44; 361/686; 108/43; 273/148 B; 40/518; 24/205.2; 400/472

(56) References Cited

U.S. PATENT DOCUMENTS

| | | | | | |
|---|---|---|---|---|---|
| 4,254,568 | A | * | 3/1981 | Ranalli | 40/518 |
| 4,484,743 | A | * | 11/1984 | Williams | 273/148 B |
| 5,029,260 | A | | 7/1991 | Rollason | 235/145 |
| 5,263,423 | A | * | 11/1993 | Anderson | 108/43 |
| 5,305,181 | A | | 4/1994 | Schultz | 361/680 |
| 5,583,742 | A | | 12/1996 | Noda et al. | 361/683 |
| 5,598,527 | A | | 1/1997 | Debrus et al. | 345/173 |
| 5,605,406 | A | | 2/1997 | Bowen | 400/472 |
| 5,657,201 | A | * | 8/1997 | Kochis | 361/686 |
| 5,713,548 | A | * | 2/1998 | Boyer et al. | 248/205.2 |
| 5,717,938 | A | | 2/1998 | Garthwaite et al. | 395/751 |
| 5,747,756 | A | * | 5/1998 | Boedecker | 200/5 A |
| 5,764,164 | A | | 6/1998 | Cartabiano et al. | 341/22 |
| 5,845,282 | A | | 12/1998 | Alley et al. | 707/10 |
| 5,927,210 | A | * | 7/1999 | Hacker | 108/43 |
| 5,957,595 | A | | 9/1999 | Chen | 400/472 |
| 5,992,817 | A | | 11/1999 | Klitsner et al. | 248/694 |
| 6,010,071 | A | * | 1/2000 | Bard et al. | 235/462.43 |
| 6,036,093 | A | * | 3/2000 | Schultz | 235/462.44 |
| 6,037,942 | A | | 3/2000 | Millington | 345/353 |
| 6,112,141 | A | * | 8/2000 | Briffe et al. | 345/1.3 |
| 6,142,687 | A | * | 11/2000 | Lisak | 400/472 |
| 6,184,804 | B1 | * | 2/2001 | Harrison | 341/22 |

* cited by examiner

Primary Examiner—Steven Saras
Assistant Examiner—Uchendu O. Anyaso
(74) Attorney, Agent, or Firm—Paul B. Hernssens; Hogan Hartson LLP (57) ABSTRACT

An apparatus and a method for entering data into a computerized navigation system of an aircraft is described. The device is strapped to the thigh with a connection provided to the aircraft avionics. To facilitate safety, quick release of the device from the avionics is provided. Alternatively, instead of a hard wired connection, a wireless connection is disclosed utilizing radio frequencies or infrared light. Alternatively, a pull away release is provided on the strap. The device consists of the keyboard that is ergonomically designed to provide one handed operation. Key layout on the keyboard is ergonomically designed to facilitate operation of the avionics being controlled. Backlighting of the keyboard provides illumination so that operation in low light conditions is possible. The keyboard may be equipped with a cover attached by a hinge that may be removed. The cover provides a convenient writing surface for the operator.

29 Claims, 7 Drawing Sheets

APPARATUS FOR DATA ENTRY

CROSS REFERENCE TO RELATED APPLICATION

This application claims the benefit of U.S. Provisional Patent Application No. 60/145,078 filed Jul. 21, 1999, the contents of which is hereby incorporated by reference.

BACKGROUND OF THE INVENTION

The amount of avionics hardware present in an aircraft cockpit has increased dramatically. This is because of technical advances that continually increase the features available on an airborne platform. Flight crews are faced with having to perform an increasing number of complex tasks in a limited space. In general, cockpit space has not increased to accommodate the additional avionics. This means that the pilot and other crew members are faced with having to flip an increasing number of switches and carry out added tasks, such as operating the aircraft controls, in a cramped environment. In order to safely operate the aircraft, the FAA requires that the controls are accessible without interference. The FAA may evaluate an equipment layout and order the removal of equipment deemed to interfere with the control of the aircraft. This problem becomes acute with the continuing efforts to squeeze increasing amounts of equipment into a limited volume available in the cockpit to take advantage of newly available avionic functions.

However, even with increased automation of aircraft functions, the simple activity of logging certain events, or pieces of information on paper remains. Entries into a printed log, is still an integral part of the required tasks of a crew member. The paper log is often kept on a clipboard that is strapped to the crew member's thigh. This keeps the clipboard secure and within easy reach.

In a common helicopter cockpit configuration, the pilot (or other member of the flight crew) has to log information on an appropriate printed form, and also operate instruments on the control panel. With the introduction of various types of on-board computer systems, the use of an input device is required to enter data into the computer.

The equipment used to achieve these tasks comprises individual pieces of hardware such as a notepad and a regular computer keyboard. In most cases there has to be a designated space for such a notepad, and the data input device is normally part of some type of instrumentation panel, or tray mounted.

One particular avionics device is an onboard navigation computer that utilizes digitized map information, such as available in a commercially available street atlas, to provide a moving map system. To locate an address, the crew member keys in the street address to be found and the navigational computer displays a map of the surrounding area with the location of the address indicated on it. Such a navigational computer is commonly used in law enforcement, where it is desirable to locate an address on a map from the air. In the prior state of the art, before the widespread use of navigational computers, the flight officer actually looked the address up on a street atlas or on a map and told the pilot where to go.

In one particular navigation system, the keyboard is removable and may be held by the operator while keying in information. In the cramped confines of a cockpit, this simple action is hazardous to the crew members because it interferes with their operation of the aircraft controls.

In summation, there are a number of drawbacks and hazards associated with the situation described above. One is that it is a very poor utilization of the cockpit space, which is severely limited. Another aspect relates to the fact that a regular or standard (PC compatible, in most cases) keyboard was designed for a general two handed desktop, and not aviation use. Because it is unsafe, cumbersome and inefficient to use a keyboard of a standardized layout in this specialized application an input device that overcomes these limitations is needed.

There currently exists in the state of the art a strong need for a data entry apparatus that effectively utilizes the limited space available in an aircraft, or otherwise cramped environment of a vehicle, without interfering with the operation of the vehicle or aircraft. Advantageously, the data entry apparatus of the present invention meets these needs by providing a keyboard that is ergonomically designed to be operable with one hand, is of compact dimensions, is secured to the operator's thigh, and contains a writing surface on a hinged cover.

SUMMARY OF THE INVENTION

Many of the attendant features of this invention will be more readily appreciated as the same becomes better understood by reference to the following detailed description considered in connection with the accompanying drawings in which like reference symbols designate like parts throughout.

Accordingly, the present invention is directed toward the creation of a method and a versatile apparatus which fits naturally in the cockpit environment of an aircraft and corrects the above mentioned drawbacks of the current systems. The present invention assists users like pilots, co-pilots and flight officers in the performance of their tasks.

The present invention therefore provides an apparatus which can be used for logging data on printed paper forms, and inputting data to the on-board computerized navigation system of an aircraft. By optimizing the ergonomics of the design, operational safety of the aircraft is increased.

Additionally, the present invention does not require a user to undergo specific training or to change his/her learned way of performing the specific function as a crew member of the aircraft.

Many of the attendant features of this invention will be more readily appreciated as the same becomes better understood in a reference to the following detailed description considered in connection with the accompanying drawings.

DESCRIPTION OF THE DRAWINGS

These and other features and advantages of the present invention will be better understood from the following detailed description read in light of the accompanying drawings, wherein.

DETAILED DESCRIPTION OF THE INVENTION

The described embodiments of this invention are of a device that allows safe and efficient operation of an input device in a cramped environment. While secured to the leg of the user, this device facilitates a more comfortable execution of the required operations performed by a user, and minimizes the motions of the user in performing the required operations. Another important aspect is that this invention is that it better utilizes the space available in a cockpit of an aircraft. Better space utilization is accomplished by removing the data entry portion of the hardware from an instrumentation panel to the apparatus for data entry. More room is available for other important electronic equipment to be installed in the instrumentation panel, and interference with the controls is eliminated.

Figure 1:
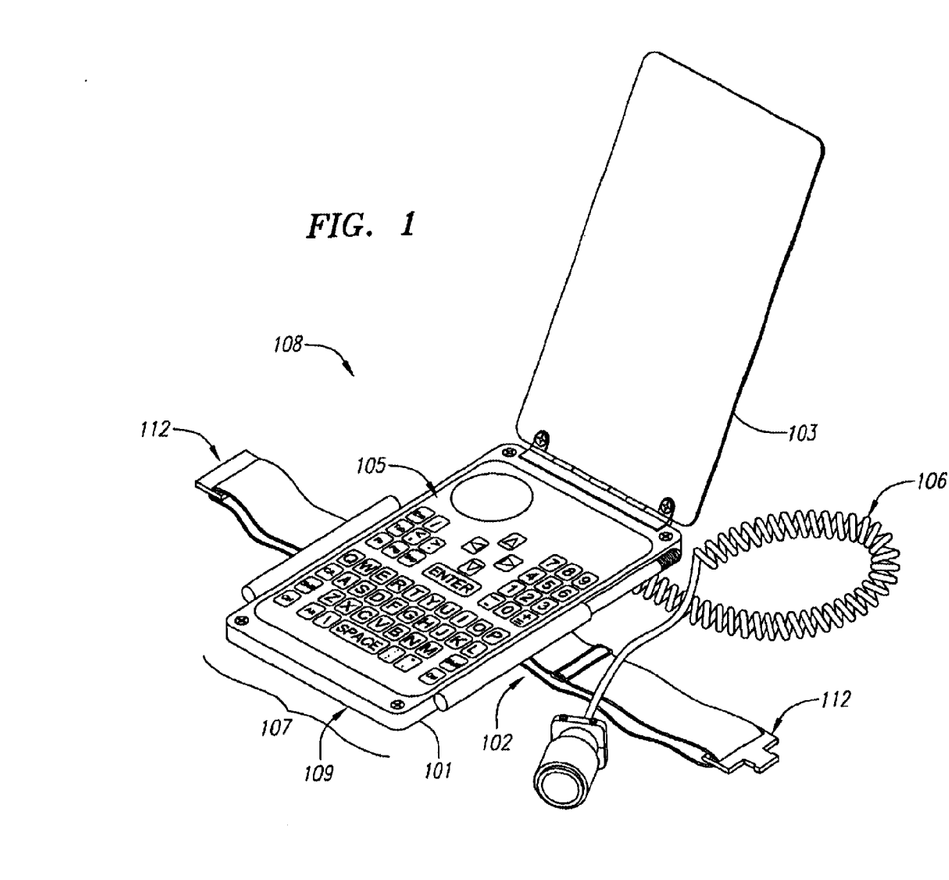
FIG. 1 depicts an apparatus for data entry in perspective view from the side.

FIG. 1 depicts an apparatus for data entry 108 in perspective view from the side. In the embodiment shown the apparatus for data entry includes an ergonomic housing, or body 101, data entry electronics, a cover 103, a strap system 102, and a communications system 106 for coupling the data being entered into a remote instrument.

In the embodiment shown a user such as a flight officer in a helicopter straps the apparatus for data entry 108 to his thigh. The user secures the apparatus for data entry by using a strap 102 equipped with a fastener 112. The body 101 of the apparatus for data entry has a recess, or curve at the bottom 107 to allow for the curve in the operator's thigh. The curved portion 107 of the case is lined with a material 109 that tends to prevent the apparatus for data entry from shifting position when in use.

Figure 2:
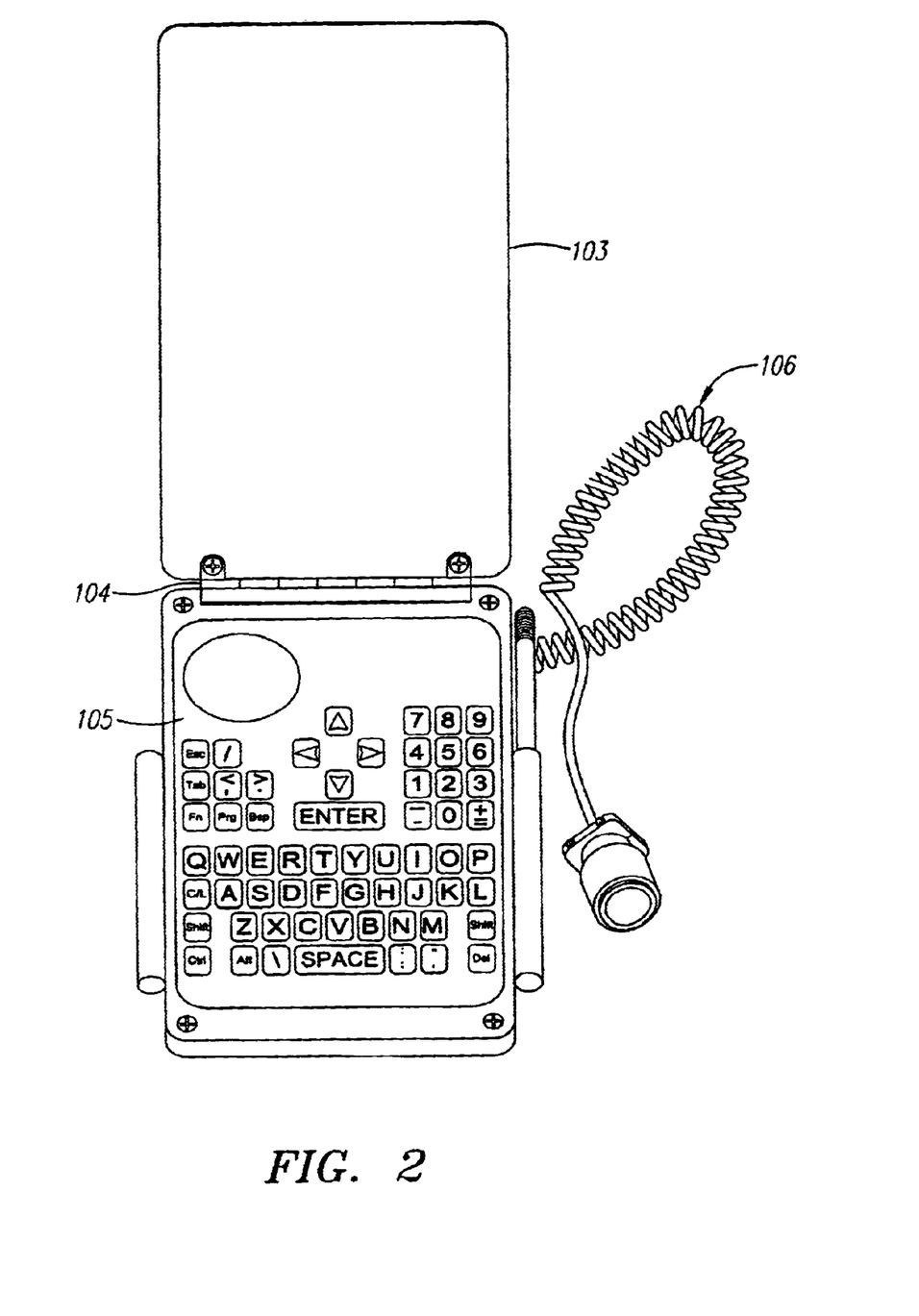
FIG. 2 is a perspective view of the apparatus for data entry having a hinged cover 103 in an opened position so that access to the ergonomically designed keyboard 105 by an operator is obtained.

FIG. 2 is a perspective view of the apparatus for data entry having a hinged cover 103 in an opened position so that access to the ergonomically designed keyboard 105 by an operator is obtained. When the cover is closed the keyboard is protected and the cover serves as a writing surface. The hinge 104 that secures the cover is removable in an alternative embodiment.

Figure 3:
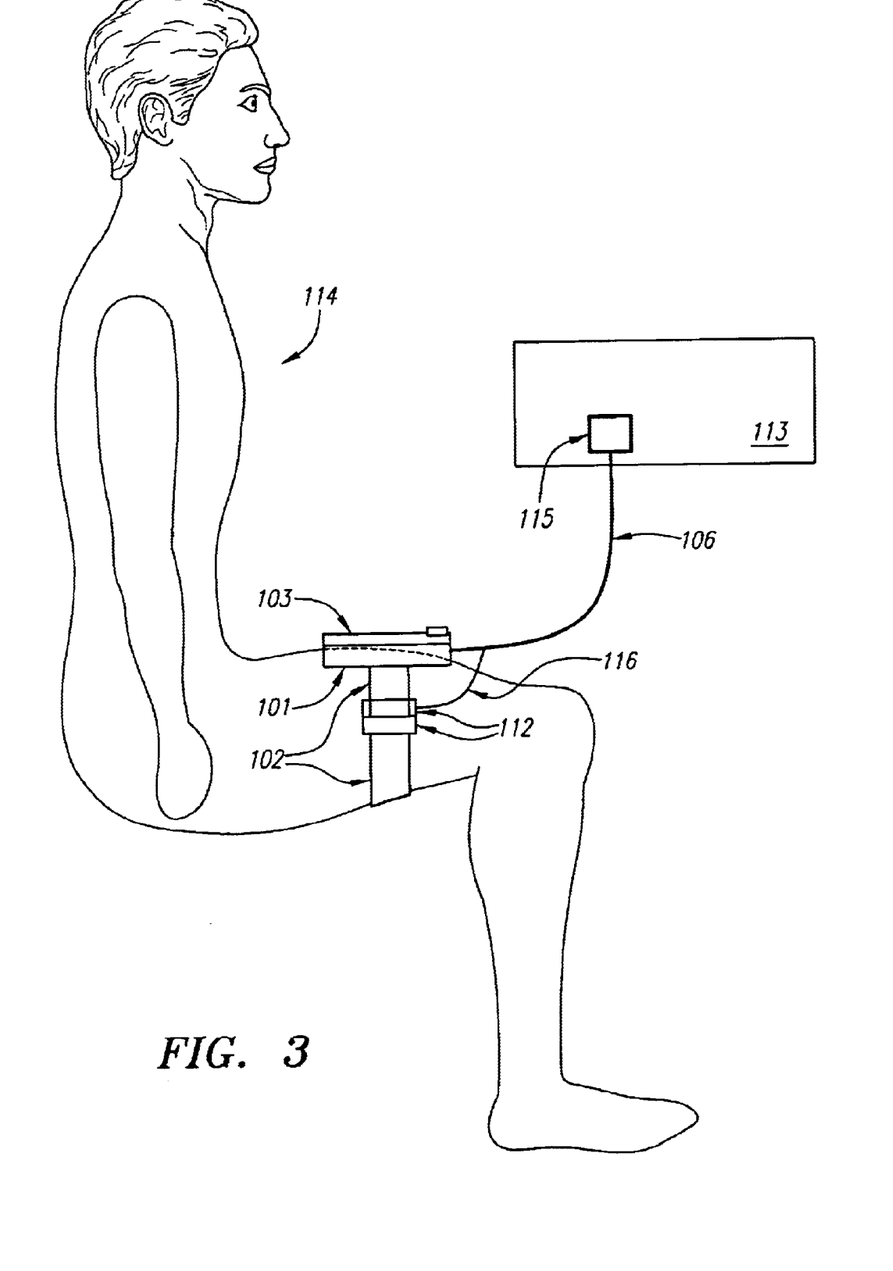
FIG. 3 illustrates the apparatus for data entry being used to interface an operator to an instrument.

FIG. 3 illustrates the apparatus for data entry being used to interface an operator 114 to an instrument 113. In an embodiment, the apparatus for data entry 108 is interfaced to the on-board navigation system, or other instrument 113, of the aircraft. Any instrument utilizing data entry via a keyboard, track pad, mouse force stick and so on may advantageously utilize the apparatus for data entry.

A cable 106 provides data communication and electrical power to the unit in the embodiment shown. The cable is supplied with a connector 115 that couples the apparatus for data entry 108 to the instrument 113. In the embodiment shown the connector 115 utilizes a standard pin out of signal connections utilized by any conventional personal computer. However, any pin out may be utilized equivalently as required by the instruments being coupled to. In alternate embodiments, the cable 106 is replaced by a wireless connection to the above mentioned navigation system or instrument. Power is supplied to the unit via an internal battery pack within the apparatus for data entry. The wireless connections may be provided by an IR or RF link.

A strap system provides a safe way to secure the apparatus for data entry to an operators thigh. The apparatus for data entry 108 is designed to securely and comfortably strap to the thigh of the operator by utilizing a special belt or strap 102. In the embodiment shown, a fastener 112 secures the strap 102 around an operators thigh with a quick release mechanism. The bottom of the body 101 is curved 107 to accommodate the operator's thigh. An operator places the apparatus for data entry 108 on the top of his thigh in preparation for using it, typically when in a seated position. The operator passes the strap around his thigh, encircling it, and then secures the ends of the strap together.

Quick release straps promote operator safety. In embodiments retaining the cable 106, a quick release system is provided for operator safety. It is unsafe to have a crew member tethered to the aircraft and having to perform some operation in order to free himself quickly. In the embodiment shown, the operator may disengage himself by releasing the quick release fastener 112. Release is accomplished by a tug on the quick release cable 116. When the operator moves to the end of the cable's 106's travel the pull is transferred to a release mechanism of the fastener 112. The pull opens the fastener and frees the operator.

In alternative embodiments hook and loop tape such as "velcro" provides a quick release fastener. A tug on one end of a strap, having either the hooks or loops at the end being pulled on, is enough to pull the ends apart releasing the operator. In the hook and loop tape arrangement, the cord is attached to one end the strap so that when the cord receives a pull, such as would occur when it reaches its end of travel, it pulls on one end of the hook and loop tape strap causing a quick break away of the strap from around the operator's thigh. Alternatively quick release through the cable is provided by a break away connector.

Figure 4:
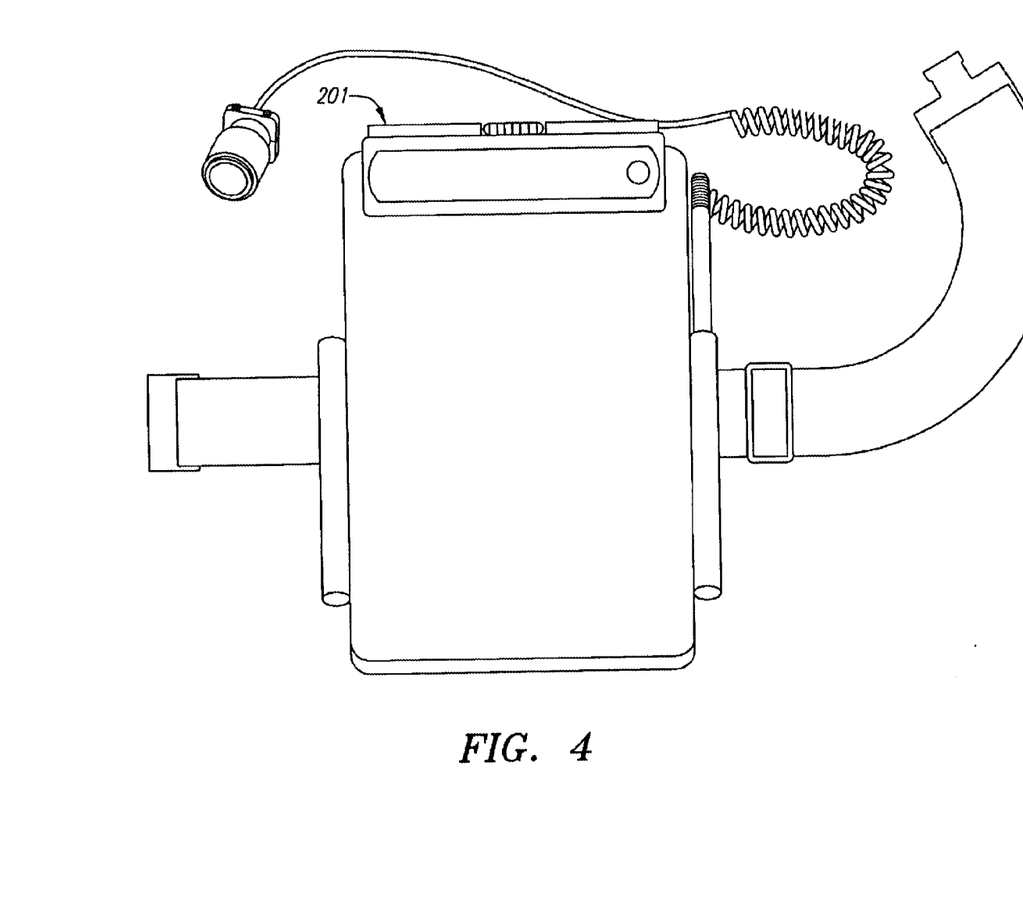
FIG. 4 shows the apparatus for data entry with the cover lowered (closed) for use as a notepad.

FIG. 4 shows the apparatus for data entry with the cover lowered (closed) for use as a notepad. At the top of the notepad a clip mechanism 201 is provided for holding printed forms, or other papers to the cover. In the lowered position with the notepad clipped to the cover by a clamping device 201, logging notes on specially designed printed paper forms or regular paper may be conveniently done by the operator. When the notepad 103 is lifted in the upright position, access to the keyboard 105 is obtained. In an alternate embodiment the cover is removable. In a second alternative embodiment the hinge is disposed on a side of the ergonomic housing. The hinge may be disposed on either side so that the cover opens to the operator's right or left as a book opens, depending on the side the hinge is disposed on.

Figure 5:
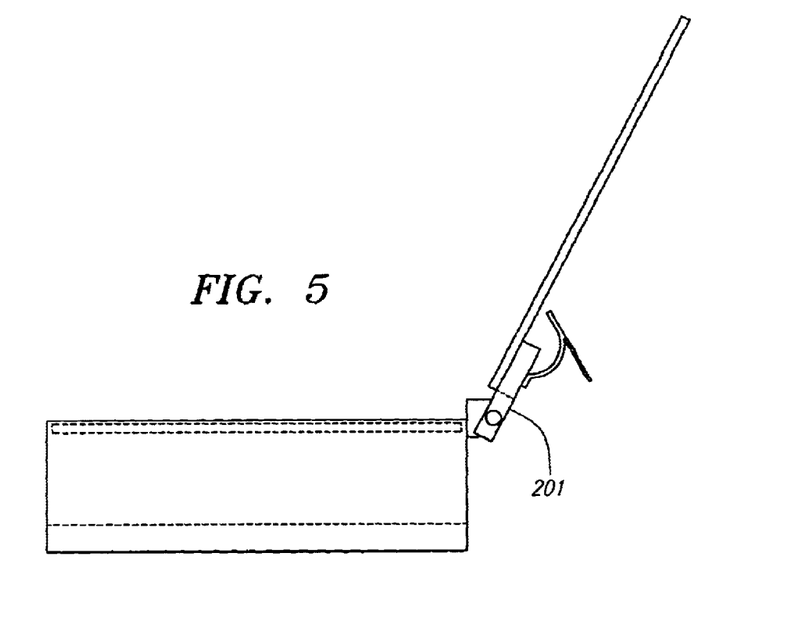
FIG. 5 depicts an embodiment of the apparatus for data entry equipped with a removable cover.

FIG. 5 depicts an embodiment of the apparatus for data entry equipped with a removable cover. The cover is made removable by the substitution of a removable hinge for the previously described fixed hinge 104. Such a cover may be removed by opening it fully as shown. A fully opened position disengages the cover from a locking device of the hinge. Once disengaged, the cover is removed by sliding the cover off of the hinge pin laterally. When installed on the hinge pin, the cover is locked keeping it from coming off. In an alternate embodiment of the invention, the input device 105, or keyboard is supplied without a cover equivalently other types of removable hinges known to those skilled in the art are equivalently utilized to secure the cover to the apparatus for data entry.

Figure 6:
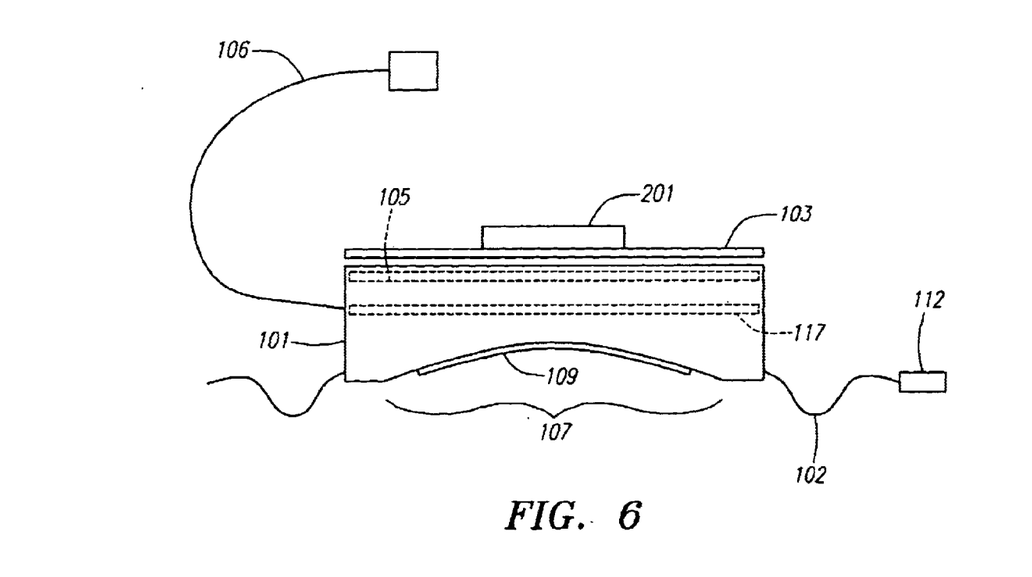
FIG. 6 is an end view of the device for data entry showing a recess in the device case that tends to conform with an operators thigh that is lined with a non slip material to prevent the apparatus for data entry from shifting during use.

FIG. 6 is an end view of the device for data entry showing a recess in the device case that tends to conform with an operators thigh 107 that is lined with a non slip material 109 to prevent the apparatus for data entry from shifting during use.

An ergonomically designed housing 101 having a concave curved bottom 107 allows the ergonomically designed housing to be in substantial contact with a persons thigh when the ergonomically designed housing is strapped to the thigh, as shown in FIG. 3. The concave bottom surface tends to prevent the apparatus for data entry from slipping from side to side during use. For additional stability a non slip surface is added in an embodiment that tends to prevent slipping.

The non-slip surface is disposed on the ergonomic housing to keep the apparatus for data entry on top of the operators thigh. The apparatus 108 is secured in place by providing a non-slip surface 109 on the curved part of the body 107 that contacts the thigh and is secured by the strap 102. The non slip material may be any suitable material. For example, sponge rubber, hook and loop tape (with the mating half secured to the operator) silicon rubber and the like may be equivalently used.

Keyboard electronics disposed on one or more printed wiring boards (PWB's) 117 are mounted within the housing 101. Such electronics include the printed wiring board containing the switches actuated by the keys of the keyboard, buffer chips, display driver chips and the like. The cord 106 enters the housing 101 and is coupled to the printed wiring board 117.

Figure 7:
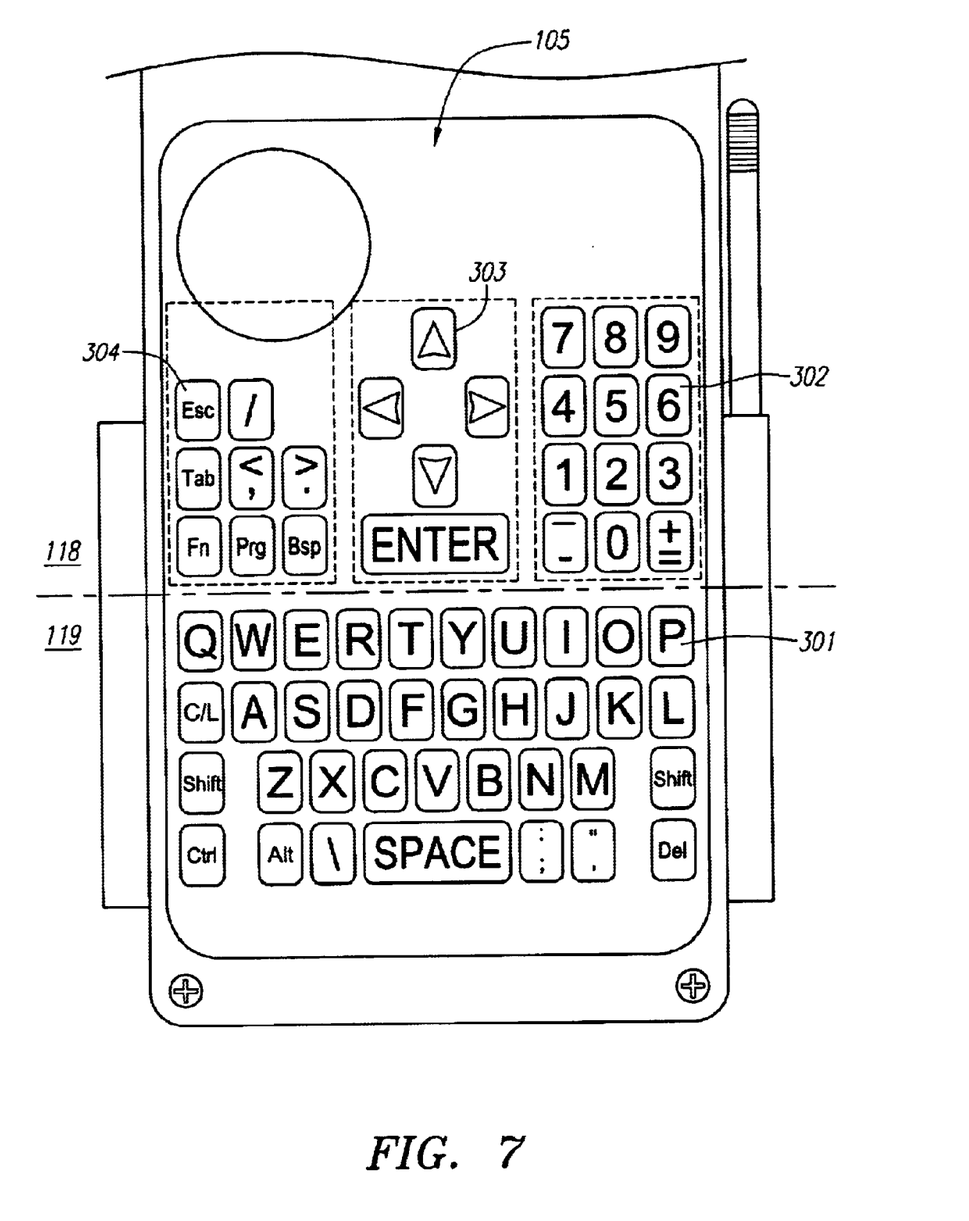
FIG. 7 is a representation of an embodiment of the invention depicting an ergonomic keyboard layout, applicable to use with a moving map system, or other instrument utilizing an operator's input.

FIG. 7 is a representation of an embodiment of the invention depicting an ergonomic keyboard layout, applicable to use with a moving map system, or other instrument utilizing an operator's input. The keyboard layout addresses two important design goals:

First, the keyboard layout should fit the space constraints while providing the desired ergonomic design. This is accomplished by a vertical orientation of the layout, giving an overall size to the device so that it can be strapped to the thigh of the operator.

Second, the layout ergonomically provides for one-handed operation. The layout takes into account the input requirements of the navigational (mapping) equipment technologies currently available.

Figure 8:
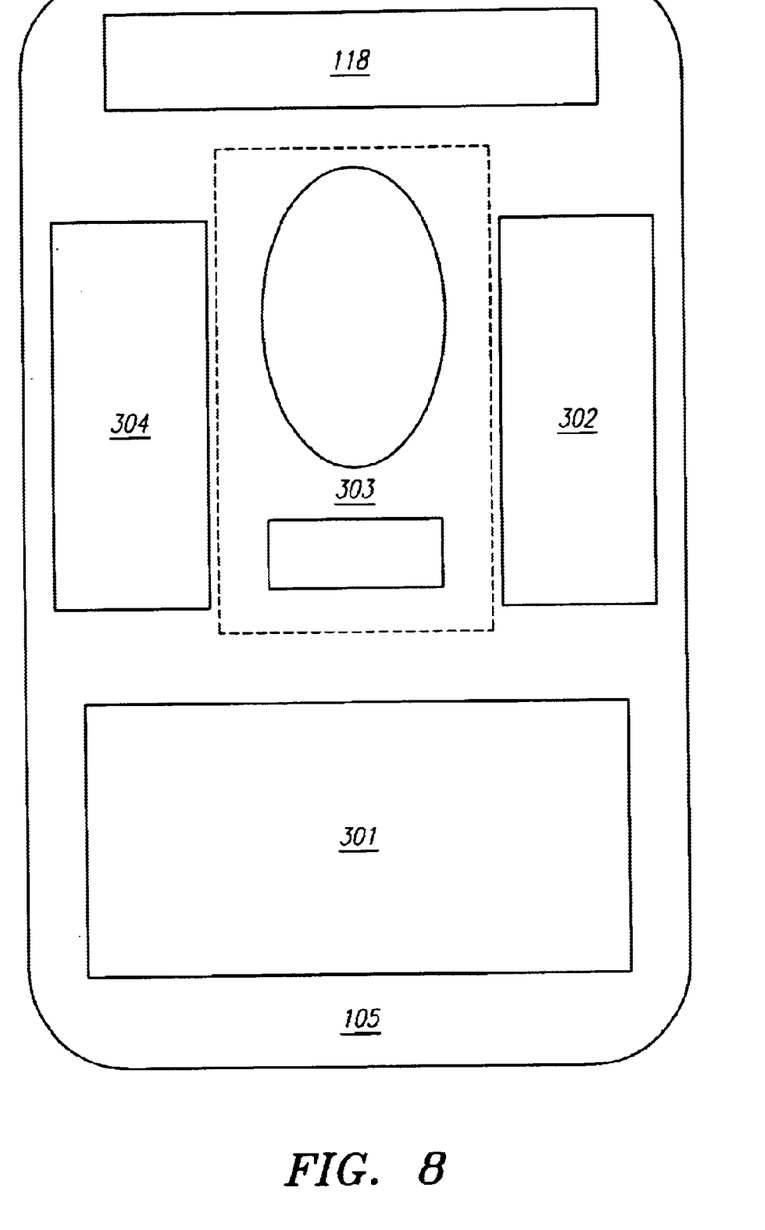
FIG. 8 is an outline view of functional key grouping in an embodiment of the apparatus for data entry.

FIG. 8 is an outline view of functional key grouping in an embodiment of the apparatus for data entry. In accordance with the considerations discussed above, the keyboard layout is divided into four sections, or groups. Breaking the layout of the keys on the keyboard into functional groups allows the ergonomic arrangement of keys for functional operation to be achieved. The sections are an alphabetical section, a numeric section, a cursor movement section, and a special function section.

An alphabetical key section, or group 301, is provided for text entry. On the lower portion of the key layout 119 is a large central section 301 which is the alphabetical portion of the layout. For easier operation, this section preserves the standard layout of a computer (PC compatible) keyboard. Equivalently other key arrangements may be provided in this section, as desired by the user to enter text. On the upper portion of the key layout 118 there are three more sections of keys.

A numeric keypad section allows data entry of numbers. The right hand section 302 provides a customized numeric keypad. As shown some mathematical operators are disposed in this area as desired to achieve a given functionality.

The cursor movement section 303 is advantageously placed in the center of the layout. In the embodiment shown the central section contains the arrow keys to move a cursor, and the "ENTER" key. In alternative embodiments a track ball, force stick, glide pad or other cursor movement device are utilized to move a cursor. For example a force stick such as one in the series 105, 106 or 108, manufactured by CTS Corporation, or its equivalents provides cursor movement by sensing a direction of force applied to the force stick and moving the cursor. Driver electronics associated with cursor movement are advantageously disposed on the PWB 117 of FIG. 6.

A special function key section 304 is provided. The left hand section is dedicated to keys used for special functions. For example "f" keys or user defined functions may be implemented with keys disposed in this area.

It will be appreciated by those skilled in the art that varying the arrangement of the four sections described will equivalently provide the ergonomic functionality described depending upon user preferences and the degree of functionality desired on the keyboard. For example in an alternate embodiment the alphanumeric section is oriented at the top of the keyboard, with the remaining three sections disposed at the bottom of the keyboard.

FIG. 8 illustrates a keyboard embodiment having an integral data display 118 present in the keyboard. The data display enables an operator to verify correctness of information, such as an address, prior to entering it into an attached instrument. Alternatively messages or prompts from the instrument may be displayed in this area. The display may be equivalently implemented by a LED device or a LCD, such as a backlit type for ease in night viewing. An exemplary data display device is the part number PRD250LPW, manufactured by OPTREX Corporation, or its equivalents.

Back-lighting of the keyboard is provided in the embodiments shown. The backlighting utilized is an adjustable back-lighting of the keyboard 105. This feature is necessary in order to enhance the safe operation at night or in case of insufficient ambient light. In an embodiment of the invention, backlighting of the keyboard may be continuous or provided by a photosensitive device that activates the lighting mechanism once the ambient light falls below a predetermined level. In an alternate embodiment of the invention, when the notepad is lifted illumination of the keyboard is activated. In alternate embodiments of the invention, backlighting may be provided by an electro luminescent (EL) board disposed beneath a keyboard overlay. In an alternative embodiment, backlighting is provided by a fiber optics panel carrying light to a membrane switch.

Key activation is provided by multiple keyboard embodiments. An embodiment of the keyboard utilizes a membrane switch which provides an economical solution to implementing a keyboard layout, and is easily fabricated. A further alternate embodiment utilizes a stamped steel keyboard. This type of keyboard has bubbles where the key locations are, providing a tactile orientation to the user. A stamped steel keyboard may also be backlit. In addition to possessing a long life, the stamped steel keyboard possesses the advantage of allowing smaller circuit components to be used in the construction of the device for data entry. However, this type of keyboard possess a high tooling cost and is not amenable to rapid design changes. As is readily apparent to those skilled in the art, the key activation of the functions presented by the keyboard layout may be implemented by any conventional method known by those skilled in the art.

While several embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of data entry into an instrument utilizing a remotely mounted ergonomically designed thigh mounted apparatus for data entry, secured to a thigh of the operator by an emergency release strap system including a quick release fastener, the quick release fastener being capable of being released by a tug on a quick release cable, the tug transmitted to the quick release cable by a power and data cable that has reached its end of travel, when the power and data cable is coupled between the apparatus for data entry and the instrument, comprising the steps of:

entering data through the thigh mounted apparatus for data entry;

displaying the data entered on the thigh mounted apparatus for data entry;

verifying the displayed data; and transmitting the verified data to the instrument.

2. An apparatus for data entry comprising:

an ergonomically designed housing substantially the same width as a person's thigh, having a single concave curved bottom allowing the ergonomically designed housing to be in substantial contact with a person's single thigh;

an emergency release strap system coupled to the ergonomically designed housing for securing the ergonomically designed housing to the person's single thigh, the strap system including a quick release fastener for freeing the person, especially in an emergency, the quick release fastener is coupled to a quick release cable having a first quick release cable end coupled to the quick release fastener and a second quick release cable end coupled adjacent to a first end of a cable, with the second end of the cable coupled to an aircraft instrument: and a keyboard disposed in the ergonomically designed housing such that substantially all of an entire keyboard area is positioned over the person's single thigh;

whereby, in an emergency the quick release fastener is released by a tug produced by a combination of the cable, and quick release cable that have exceeded their end of travel, such as when the person seeks to escape the aircraft without pausing to manually release the quick release fastener.

3. The apparatus for data entry of claim 2 in which the keyboard further comprises:

an alphabetical key section disposed at the bottom of the keyboard having a standard QWERTY key layout;

a cursor movement section disposed at the top center of the keyboard;

a numeric keypad section disposed at the top right keyboard section; and a special function key section disposed at the top left section of the keyboard.

4. The apparatus for data entry of claim 2 in which the keyboard further comprises back lighting for improved viewing of the keyboard symbols in low light conditions.

5. The apparatus for data entry of claim 2 in which the back lighting is controlled by a photosensitive device that varies the amount of backlighting depending upon ambient light conditions.

6. The apparatus for data entry of claim 2 in which the back lighting is produced by an electro luminescent keyboard underlay disposed beneath the keyboard.

7. The apparatus for data entry of claim 2 in which the keyboard is a membrane switch.

8. The apparatus for data entry of claim 2 in which the keyboard is a stamped steel keyboard.

9. The apparatus for data entry of claim 2 in which the keyboard further comprises a data display for viewing information entered into the keyboard.

10. The apparatus for data entry of claim 2 in which the keyboard further comprises a cursor movement device comprising arrow keys.

11. The apparatus for data entry of claim 2 in which the keyboard further comprises a cursor movement device comprising a force stick.

12. The apparatus for data entry of claim 2 in which the keyboard further comprises a cursor movement device comprising a track ball.

13. The apparatus for data entry of claim 2 in which the keyboard further comprises a cursor movement device comprising glide pad.

14. The apparatus for data entry of claim 2 in which the quick release fastener further comprises a quick release hook and loop tape mechanism having hook tape disposed at a first end of a strap and a loop tape disposed at a second end of the strap, with the quick release cable coupled to a strap end, and with the strap coupled to the housing and capable of encircling the person's thigh.

15. The apparatus for data entry of claim 2 further comprising a cover disposed over the keyboard providing a substantially flat writing surface.

16. The apparatus for data entry of claim 15 in which the cover includes a clip for attaching sheets of paper to the cover.

17. The apparatus for data entry of claim 15 further comprising a hinge for coupling the ergonomically designed housing to the cover, such that when the cover is in a closed position the keyboard is covered, and when the cover is in an opened position an operator may access the keyboard.

18. The apparatus for data entry of claim 17 in which the hinge is removable, allowing the cover to be removed.

19. An apparatus for data entry comprising:

an ergonomically designed housing, substantially the width of a person's thigh, having a single concave curved bottom allowing bottom of the ergonomically designed housing to be in substantial contact with a person's single thigh;

an emergency release strap system coupled to the ergonomically designed housing, for securing the ergonomically designed housing to the person's single thigh, the strap system including a quick release fastener for freeing the person, the quick release fastener coupled to a quick release cable, having a first quick release cable end coupled to the quick release fastener and a second quick release cable end coupled near a first end of a cable, and with the second end of the cable coupled to a remote instrument;

a membrane keyboard, substantially the width of the person's thigh, disposed within the ergonomically designed housing and having a standard QWERTY layout disposed at the bottom of the keyboard;

a cover disposed above the membrane keyboard and coupled to the ergonomically designed housing, protecting the membrane keyboard, and providing a writing surface when closed and allowing access the membrane keyboard when opened;

a clamping device coupled to the cover, for securing paper to the writing surface;

a display disposed at the top of the membrane keyboard;

a backlighting device disposed beneath the keyboard;

a photosensitive device disposed in the ergonomically designed housing for adjusting the backlighting device to compensate for ambient light conditions; and a force stick disposed at the bottom middle section of the membrane keyboard.

20. An input device for controlling a mapping, and navigation computer system comprising:

a housing having a width that conforms to that of a typical person's thigh;

an emergency release strap system coupled to the housing for securing the housing to a crew member's single thigh, the strap system including a quick release fastener for freeing the crew member in an emergency, by a pull to the quick release fastener that is provided through a quick release cable having a first quick release cable end coupled to the quick release fastener, and a second quick release cable end coupled adjacent to a first end of a cable, and the second end of the cable coupled to the mapping and navigation computer system, as the crew member seeks to flee:

a thigh width keyboard disposed in the housing easily accessible to the crew member for inputting data into the mapping and navigation computer system; and a hinged cover attached to the housing that provides a writing surface when covering the keyboard, and may be flipped out of the way when keyboard access is required;

whereby, when the cable reaches its end of travel, a pulling force on the cable occurs that is transferred to the quick release cable, which in turn transfers the pulling force to the quick release fastener, causing the quick release fastener to release the strap system from the crew member's thigh, so that the crew member is no longer tethered to an aircraft in which the mapping and navigation computer system is mounted.

21. The apparatus for data entry of claim 2 further including a nonslip material lining the concave curved bottom of the ergonomically designed housing.

22. The apparatus for data entry of claim 21 in which the nonslip material is loop tape.

23. An apparatus for data entry comprising:

an ergonomically designed housing having a single concave curved bottom allowing the ergonomically designed housing to be in substantial contact with a person's single thigh;

an adjustable elastic strap system, coupled to the ergonomically designed housing, for securing the ergonomically designed housing to the person's single thigh, the adjustable elastic strap system including an emergency quick release fastener for freeing the person in an emergency a quick release nylon strap having a first end coupled to the emergency quick release fastener;

a power cord having a first end coupled to an aircraft instrument, the aircraft instrument being disposed in an aircraft instrument panel, and a second end coupled to the ergonomically designed housing, and a second end of the quick release nylon strap coupled to the power cord near the second end of the power cord; and a keyboard disposed in the ergonomically designed housing, such substantially all of a keyboard layout of the keyboard is positioned over the person's single thigh;

whereby, the quick release fastener is released by a force applied to the emergency quick release fastener when the person attempts to escape an aircraft;

whereby the force is created when the person moves farther away from the aircraft instrument panel, than a length of the power cord, with the force being transmitted to the quick release fastener through the quick release nylon strap that is coupled to the power cord.

24. The apparatus for data entry of claim 23 in which the emergency quick release fastener, of the strap system further comprises a quick release hook and loop tape mechanism, the mechanism includes a hook tape disposed at an end of an elastic strap of the adjustable elastic strap system, and with loop tape disposed at an opposing end of the elastic strap of the adjustable elastic strap system, the quick release nylon strap is coupled between the an end of the elastic strap and the power cord;

whereby a tug provided by the quick release nylon strap causes the quick release hook and loop tape mechanism to release the person by pulling apart the hook and loop tape that had been previously joined to secure the apparatus for data entry to the person's thigh.

25. The apparatus for data entry of claim 23 in which the strap system further comprises an emergency quick release mechanism of the quick release fastener, coupled to a quick release nylon strap, with a first end of the nylon quick release strap coupled to the quick release mechanism, and a second end of the nylon quick release strap coupled at an end of a power cord coupled to the housing, and having a second end of the power cord coupled to a remote instrument.

26. The apparatus for data entry of claim 23 in which the keyboard further comprises back lighting for improved viewing of the keyboard symbols in low light conditions.

27. The apparatus for data entry of claim 23 in which the back lighting is controlled by a photosensitive device that varies the amount of backlighting depending upon ambient light conditions.

28. The apparatus for data entry of claim 23 in which the back lighting is produced by a fiber optics underlay disposed beneath the keyboard.

29. The apparatus for data entry of claim 23 further comprising a hinged cover coupled to the housing and disposed over the keyboard, providing a substantially flat writing surface when the keyboard is covered.

* * * * *